United States Patent [19]

Nihei et al.

[11] Patent Number: 5,511,007
[45] Date of Patent: Apr. 23, 1996

[54] DIAGNOSTIC METHOD FOR A REAL TIME SENSOR MOUNTED ON A ROBOT

[75] Inventors: Ryo Nihei; Yasuo Naito; Hiroshi Wakio; Takashi Iwamoto, all of Oshino, Japan

[73] Assignee: Fanuc Ltd., Yamanashi, Japan

[21] Appl. No.: 50,007

[22] PCT Filed: Aug. 26, 1992

[86] PCT No.: PCT/JP92/01081

§ 371 Date: Apr. 22, 1993

§ 102(e) Date: Apr. 22, 1993

[87] PCT Pub. No.: WO93/04339

PCT Pub. Date: Apr. 3, 1993

[30] Foreign Application Priority Data

Aug. 27, 1991 [JP] Japan ..................... 3-240473

[51] Int. Cl.$^6$ .................................................. G01P 21/00
[52] U.S. Cl. .............................. 364/571.01; 364/551.02; 364/474.19; 364/474.35; 364/474.37; 395/94; 395/89
[58] Field of Search .......................... 364/571.01, 571.02, 364/571.04, 571.05, 550, 551.01, 551.02, 559, 474.15, 474.16, 474.19, 474.28, 474.34, 474.35, 474.37; 395/904, 912, 88, 89, 94

[56] References Cited

U.S. PATENT DOCUMENTS

| 4,146,924 | 3/1979 | Birk et al. | 364/559 |
|---|---|---|---|
| 4,219,847 | 8/1980 | Pinkney et al. | 364/559 |
| 4,364,110 | 12/1982 | Hyatt | 364/474.22 |
| 4,380,696 | 4/1983 | Masaki | 219/124.34 |
| 4,466,770 | 8/1984 | Peroutky | 414/751 |
| 4,547,800 | 10/1985 | Masaki | 358/107 |
| 4,581,808 | 4/1986 | Lawson et al. | 29/558 |
| 4,590,356 | 5/1986 | Povlick et al. | 219/124.34 |
| 4,625,285 | 11/1986 | Mori et al. | 395/86 |
| 4,654,949 | 4/1987 | Pryor | 29/407 |
| 4,754,415 | 6/1988 | George et al. | 364/571.01 |
| 4,794,736 | 1/1989 | Fuwa et al. | 51/165.72 |
| 4,815,006 | 3/1989 | Andersson et al. | 364/571.01 |
| 4,853,863 | 8/1989 | Cohen et al. | 364/559 |
| 4,922,434 | 5/1990 | Fule | 364/559 |
| 4,998,050 | 3/1991 | Nishiyama et al. | 364/191 |
| 5,297,238 | 3/1994 | Wang et al. | 395/94 |
| 5,319,443 | 6/1994 | Watanabe et al. | 356/375 |
| 5,329,469 | 7/1994 | Watanabe | 364/571.01 |

FOREIGN PATENT DOCUMENTS

| 0378703 | 7/1990 | European Pat. Off. |
|---|---|---|
| 3413731 | 10/1984 | Germany . |
| 57-86710 | 5/1982 | Japan . |
| 57-110913 | 7/1982 | Japan . |
| 60-27809 | 2/1985 | Japan . |
| 60-62487 | 4/1985 | Japan . |
| 61-124816 | 6/1986 | Japan . |

*Primary Examiner*—Emanuel T. Voeltz
*Assistant Examiner*—Kyle J. Choi
*Attorney, Agent, or Firm*—Staas & Halsey

[57] ABSTRACT

A diagnostic method in which data obtained from a real-time sensor are stored during the operation of a robot for later diagnosis of the operation state of the sensor. This method includes the steps of scanning an object by using a laser sensor, thereby obtaining sectional data; detecting a weld line position on the basis of the sectional data; storing in a memory the weld line position along with robot positions corresponding to the time of detection; and storing in the memory the sectional data when a predetermined robot position is reached with a conditional value set to "1", when the weld line position has first failed to be detected with the conditional value set to "2", or when the variation of the weld line position is larger than a predetermined value. The operation state of the sensor is traced on the basis of the weld line position and the sectional data stored in the memory, and various parameters for detection are set so that an optimum state for detection can be established. By doing so, the operation of the sensor can be continually monitored during its operation, thereby enabling the parameters to be set to optimum values.

6 Claims, 4 Drawing Sheets

5,511,007

DIAGNOSTIC METHOD FOR A REAL TIME SENSOR MOUNTED ON A ROBOT

TECHNICAL FIELD

The present invention relates to a diagnostic method for a real time sensor mounted on the distal end portion of an arm of a robot to detect the position of an object on a real-time basis during the operation of the robot.

BACKGROUND ART

A welding robot, sealing robot, etc., are arranged so that the position of a weld line or sealing line is detected on a real-time basis by means of a sensor, such as a laser sensor, mounted on the distal end portion of a robot arm; the measurement result is delivered to a control device, and the weld line or sealing line is traced by means of a welding torch or sealing head.

The laser sensor applies a laser beam to an object, a reflected light beam is seized by means of a light sensing element, and the distance (position of the object) from the object is measured on the basis of the principle of triangulation. By scanning the laser beam by means of a rocking mirror, the distance from the object is continuously measured, whereby sectional data of the object with respect to the scanning direction (i.e., data indicative of a surface configuration in a section of the object) are obtained by one scanning cycle. The weld line position or sealing position is obtained from these sectional data.

When using the laser sensor of this type, the degree of reflection of the laser beam varies depending on the surface condition of the object, so that the output of a laser generator should be adjusted accordingly. Further, reflected light beams include a primary reflected light beam, which is obtained when an applied laser beam is reflected by the surface of the object and is incident upon the light sensing element, a secondary reflected light beam, which is obtained when the primary reflected light beam is further reflected by the surface of the object and is incident, etc. In order to detect the object position accurately, therefore, the primary and secondary reflected light beams must be distinguished from each other as they are detected, so that various detection parameters, such as a threshold value, for discriminating these reflected light beams must be adjusted.

Conventionally, the output of the laser generator and the various detection parameters used to be adjusted on the basis of measurement results are obtained by activating the sensor in several suitable places.

According to this method, the detection behavior of the sensor during a tracking operation performed on a real-time basis cannot be followed, so that whether the respective set values of the various parameters are optimum or not can be determined only indirectly by the way the operation for welding or sealing is finished. Thus, if the measurement conditions during actual operation are not known well, this will cause the problems such as those discussed below.

(1) The sensor will not be able to fully perform its function. For example, even if the detection rate can be improved by optimally selecting the parameters, the detection behavior cannot be followed precisely, so that the detection rate cannot be improved. If the detection rate has dropped, the accuracy falls naturally, so that the sensor will no longer be good enough for application to some kinds of objects.

(2) Since the influences of modification of the parameters cannot be followed accurately, it is difficult to determine optimum set values.

SUMMARY OF THE INVENTION

According to the present invention, there is provided a method for diagnosing a real-time sensor mounted on the distal end of an arm of a robot and used to detect the position of an operation target on a real-time basis, in which all data of the operation target position, detected by the sensor during the operation of the robot, are previously stored together with robot positions, and the operation state of the sensor is diagnosed by analyzing the data.

The real time sensor scans an object during the operation of the robot, detects the position of the object with respect to the scanning direction, and detects the operation target position by analyzing the detected object position. According to an aspect of the present invention, therefore, the object position data and the operation target position data obtained by analyzing the former, along with the robot position, are stored beforehand, and the stored data are displayed or printed out for analysis, whereby the operation state of the sensor can be traced. Also, these data are entered in a computer by a floppy disk or the like or through communication, and are analyzed for use in the operation state analysis and the adjustment of various parameters.

The volume of operation target position data is fractional such as one data for each scanning cycle of the sensor as compared with the object position data, which is much larger in volume, so that storing all these object position data requires a large memory capacity. According to another aspect of the present invention, therefore, the object position data are stored only when necessary. More specifically, the object position data is made to be stored in any of the cases where the robot is in a predetermined position, where the operation target position has failed to be detected, or where the detected operation target position deviates from the operation target position detected in the preceding cycle by a margin not smaller than a certain set value. An arrangement is provided such that any of these conditions can be selected and set for the storage of the object position data, whereby necessary and enough object position data can be stored.

BEST MODE OF CARRYING OUT THE INVENTION

Figure 2:
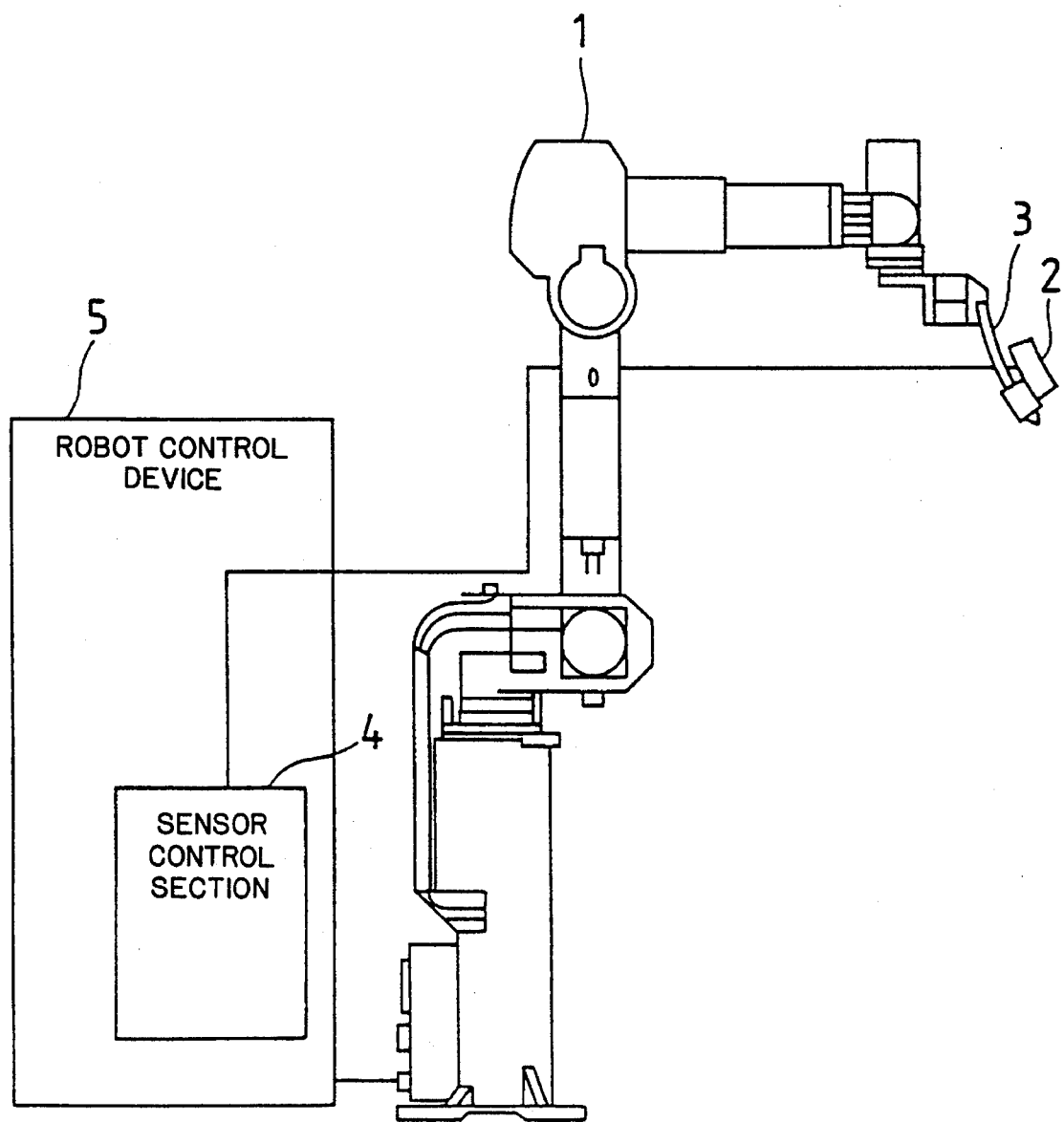
FIG. 2 is a schematic view showing a welding robot used according to the embodiment shown in FIG. 1.

The following is a description of one embodiment in which a method of the present invention is applied to a welding robot. In the welding robot shown in FIG. 2, a head of a laser sensor 2, along with a welding torch 3, are mounted on the distal end of a wrist of the robot 1. The robot 1 is controlled by a robot control device 5, while the laser sensor 2 is controlled by a sensor control section 4, which is disposed in the robot control device 5. The robot control device 5 comprises a processor, memories, an axis control circuit for controlling actuators, such as servomotors for individual joints of the robot, a manual data input device with display unit (hereinafter referred to as CRT/MDI), etc., and the sensor control section 4 also comprises a processor, memories, input and output circuits, etc. Although the robot, the laser sensor, and the control means are constructed substantially in the same manner as those of the conventional welding robot with laser sensor, there are differences in a data storage routine, which will be described later, and in that a writable nonvolatile memory for data storage occupies a large capacity.

Figure 3:
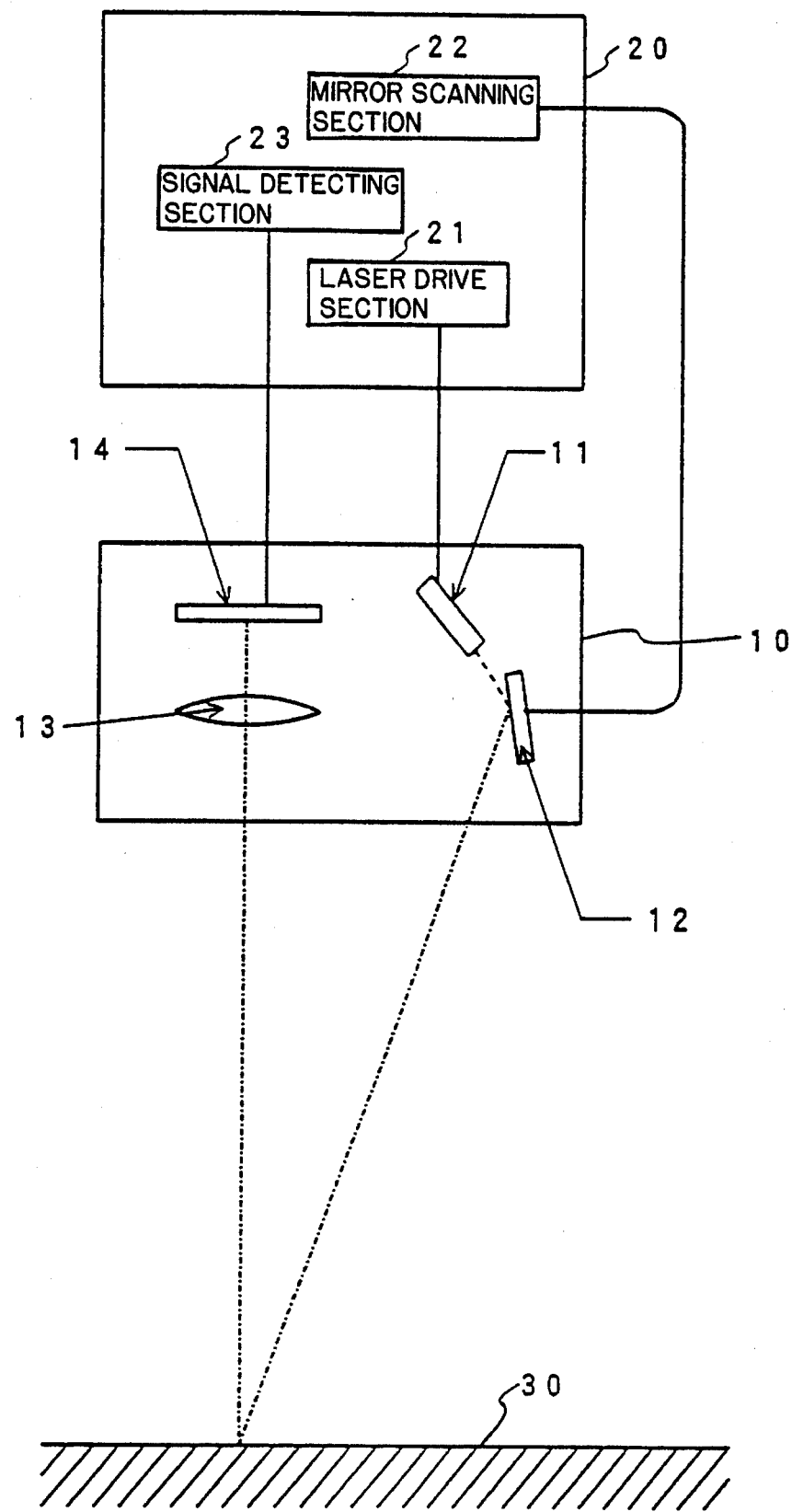
FIG. 3 is a block diagram showing an outline of a laser sensor.

Referring now to FIG. 3, the construction of the laser sensor 2 will be described. A detecting section 10 of the laser sensor includes a laser generator 11 for generating a laser beam, a rocking mirror (galvanometer) 12 for reflecting the laser beam from the laser generator 11 so that the reflected laser beam is used for scanning, a light sensing element 14 for detecting the laser beam, and an optical system 13 for picking up the reflected light and forming an image on the light sensing element 14. A control section 20 includes a laser drive section 21 for driving the laser generator 11, a mirror scanning section 22 for rocking the rocking mirror 12, and a signal detecting section 23 for detecting the position of an object 30 from the position where light is received by the light sensing element 14.

The laser drive section 21 drives the laser generator 11 to generate the laser beam, and the mirror scanning section 22 is driven to rock the mirror 12 so that the laser beam generated from the laser generator 11 is applied to the surface of the object 30 to scan the same. The laser beam, applied to the object 30 and diffusedly reflected thereby, is caused to form an image on the light sensing element 14 through the optical system 13, depending on the position of reflection on the object. The distance from the position of the image on the light sensing element 14 to the object (position of the object) is measured on the basis of the principle of triangulation. By rocking the rocking mirror (in one of directions of alternating rocking motion) for one scanning cycle, the position of the object is continuously measured, whereby sectional data of the object with respect to the laser beam scanning direction are obtained. The weld line position or sealing position is obtained from these sectional data. The laser sensor is described in detail in PCT/JP92/00630, and this description is incorporated herein for reference.

Figure 4:
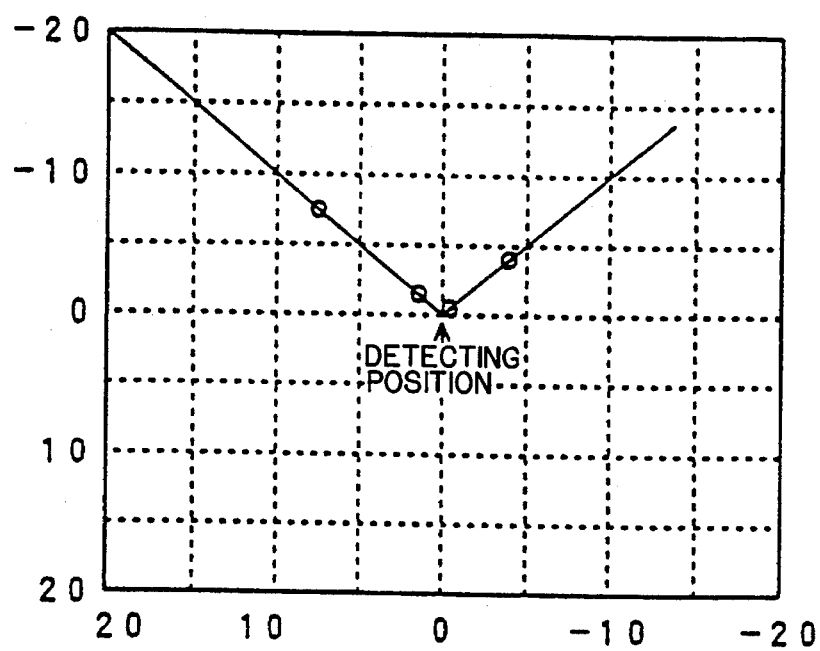
FIG. 4 is a graph showing an example of data detected by means of a light sensing element of the laser sensor.

In fillet welding, for example, the sectional data of the object with respect to the scanning direction, as shown in FIG. 4, can be obtained by scanning the rocking mirror by the laser sensor 2, with a fillet joint being used as the object. In FIG. 4, the axes of abscissa and ordinate represent the distance in the laser beam scanning direction and the distance from the object, respectively.

Figure 1:
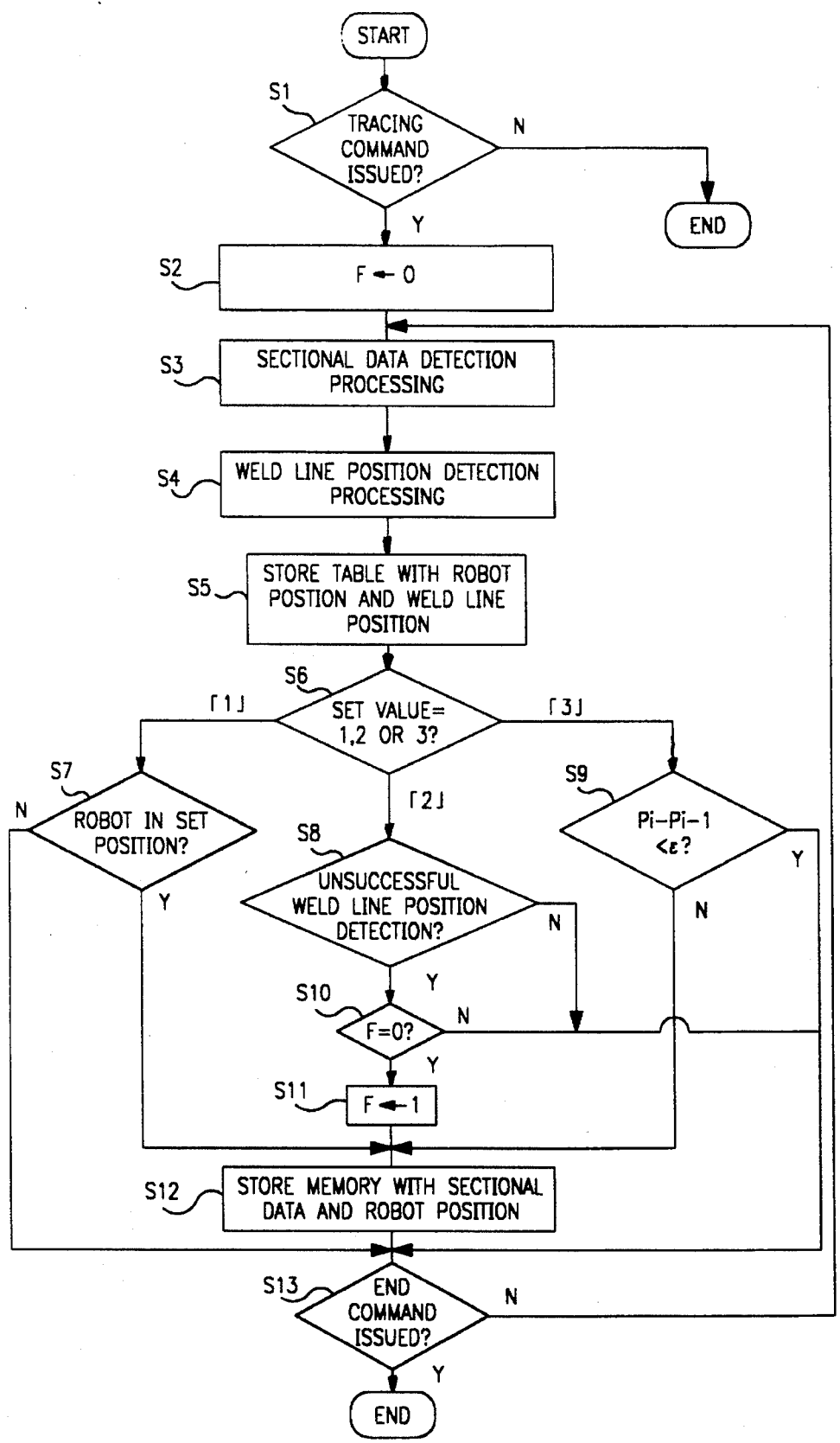
FIG. 1 is a flow chart showing a data storage routine according to one embodiment of the present invention.

Referring now to tile flow chart of FIG 1, the data storage routine, which constitutes a feature of the present invention, will be described.

First, the present embodiment is arranged so that conditions for the storage of the sectional data as object position data can selectively be set by the CRT/MDI of the robot control device 5 in the following manner: a conditional value is set to "1" in storing the sectional data with respect to a predetermined robot position, to "2" in storing the sectional data when the weld line position has first failed to be detected, and to "3" in storing the sectional data if a detected value for the weld line position is not smaller than a preceding detected value and a set value $\epsilon$. If tile conditional value is set to "1", the robot position for the storage is set by the CRT/MDI.

The processor of the sensor control section 4 determines in Step S1 whether or not a weld line tracing command is outputted from the robot control device 5; if the command has not been outputted, the routine will be finished at once, while if the weld line tracing command has been outputted, a flag F will be set to "0" in Step S2, and the program proceeds to Step S3, whereupon a sectional data detection processing will be started. In this sectional data detection processing, the rocking mirror of the laser sensor starts to be rocked, and the laser generator is activated, whereby the laser beam is applied to the object for scanning. A number of sampled data (object position data), that is, the sectional data, are obtained for each scanning cycle of the rocking mirror, and are stored in a work memory. In the case where the object is the aforesaid fillet joint, such sectional data as the ones shown in FIG. 4 are obtained.

Then, in Step S4, a weld line position detection processing is executed by using the sectional data obtained in this manner, whereupon the weld line position is delivered to the robot control device. In this weld line detection processing, for example, the outer product of a vector directed from an i'th sampled data, out of the sectional data, to an (i−1)'th sampled data and a vector directed from the i'th sampled data to an (i+1)'th sampled data is obtained, and a position where this outer product is the largest is determined as a near weld line position.

In the example shown in FIG. 4, the object is a fillet joint formed of two flat plates. When a flat surface is scanned, the scanning line is a straight line, so that the outer product is "0." When the weld position is reached, however, the scanning line bends, so that the outer product of the vectors takes a large value, and the position where the outer product takes the largest value is detected as the position near the weld line position to be obtained. The intersection of two straight lines with which two flat surfaces are approximated is obtained by using data sampled in spaced positions at given forward and backward distances from this near weld line position. More specifically, straight lines, each connecting two points which are spaced at the given forward and backward distances from the near weld line position are obtained. The intersection of the two straight lines thus obtained is detected as the weld line position. In the example shown in FIG. 4, the weld line position is detected as the intersection of the two straight lines each of which connects two circled points.

When the weld line position is detected in this manner, the detected weld line position and the current robot position, which is detected by means of the robot control device in Step S5, are correspondingly stored in a table in the nonvolatile memory.

Figure 5:
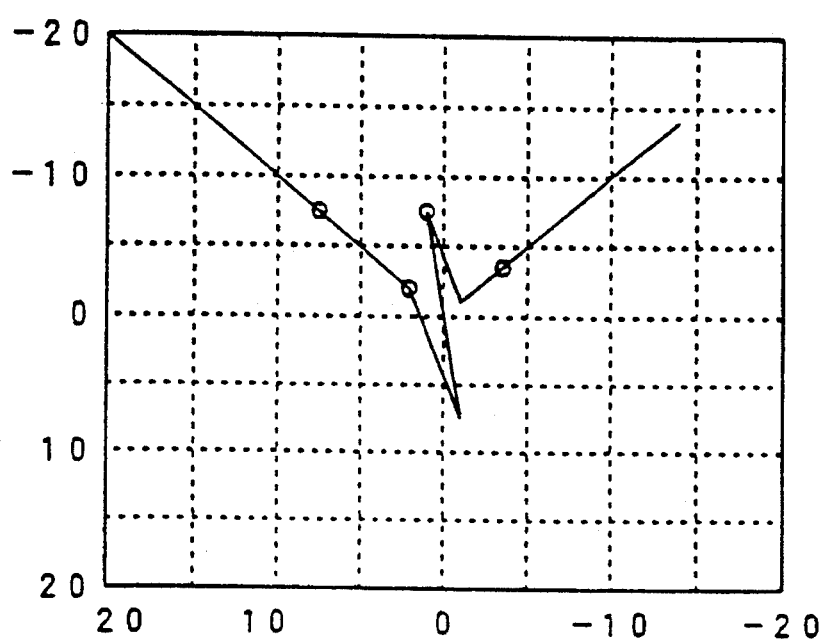
FIG. 5 is a graph showing another example of the data detected by means of the light sensing element of the laser sensor.

If the weld line position is not detected, a predetermined code which indicates the reason for the failure of detection is stored in the aforesaid table instead of the weld line position, depending on the progress of the detection processing. For example, if an edge portion (near weld line position) fails to be accurately measured, as shown in FIG. 5, and thus the definition of straight lines is not good enough to obtain the intersections of the straight lines, a code indicative of the failure to detect the intersections will be written.

Then, whether the conditional value is "1" or "2" or "3" is determined in Step S6. If it is concluded that the conditional value is "1," it is determined in Step S7 whether the current robot position is the preset position or not. If the robot position is the preset one, the program proceeds to Step S12, in which the sectional data obtained in Step S3, along with the robot position, will be loaded into the nonvolatile memory, whereupon the program proceeds to Step S13. In Step S13, it is determined whether or not a weld line tracing end command is inputted through the robot control device. If there has been no input, the program returns to Step S3, whereupon the aforementioned processings will be executed repeatedly. If it is concluded in Step S13 that the weld line tracing end command is delivered from the robot control device 5, the routine will be finished. If it is concluded in Step S7 that the robot position is not the preset position, the program proceeds to Step S13 without storing the sectional data in Step S12.

If the conditional value is "2", the program proceeds from Step S6 to Step S8, whereupon it is determined whether the detection of the weld line position in the processing of Step S4 is unsuccessful or not. If the detection is not unsuccessful, in other words, if it is successful, the program proceeds to Step S13. If the detection is unsuccessful, the program proceeds to Step S10, whereupon it is determined whether the flag F is "0" or not. If the flag F is "0", it is set to "1" in Step S11, whereupon the program proceeds to Step S12. In Step S12, the sectional data obtained in Step S3, along with the current robot position, are loaded into the nonvolatile memory. If it is concluded in Step S10 that the flag F is not "0", the program proceeds to Step S13 without executing the processings of Steps S11 and S12.

In this manner, the processing of Step S12 is executed to store the sectional data only when the first failure of weld line position detection has occurred since the start of weld line tracing. If the end command has not been inputted, the processing of Step S3 and its subsequent processings will be repeated.

If the conditional value is "3", the program proceeds from Step S6 to Step S9, whereupon it is determined whether or not the difference between the value for weld line position detected in the current processing and the value detected in the preceding processings is smaller than a preset value. If the difference is not smaller than the preset value, the program proceeds to Step S12, whereupon the sectional data are loaded into the nonvolatile memory. If the difference is smaller than the preset value, the program proceeds to Step S13, whereupon the sectional data will not be stored.

In this manner, the weld line position relative to the robot position will be stored in the table, and the sectional data with respect to the predetermined robot position, the sectional data obtained when the weld line position has first failed to be detected, or the sectional data obtained when the variation of the detected value for the weld line position is not smaller than a predetermined value are stored in the nonvolatile memory.

The nonvolatile memory for data storage is designed to store the data cyclically, so it need not have a large capacity. Further, this memory need not necessarily be a nonvolatile memory, but may be formed of a RAM instead.

The weld line position data and the sectional data, stored in the manner described above, are displayed on a CRT screen or printed out, and these data are analyzed and utilized for the adjustment of various parameters. Also, these data are entered in a computer by a floppy disk or through communication, and are analyzed to adjust the various parameters.

According to the present embodiment, in adjusting the parameters, three conditions are made available for picking out the sectional data. Firstly, the conditional value has to be set to "2" for obtaining the sectional data for the unsuccessful case of weld line position detection so that the various parameters can be modified to obtain the weld line position in accordance with these data. For example, if such sectional data as the ones shown in FIG. 5 are obtained, the intersection of the straight lines, that is, the weld line position, should be able to be obtained by modifying parameters associated with the distance for defining the straight lines from the near edge portion (near weld line position). While adjusting the parameters in succession, thereafter, the conditional value is set to "2" to pick the data and adjust the parameters until the failure in detecting the weld line position disappears. When the failure in detecting the weld line position disappears, the conditional value will be changed to "3", and the sectional data at the point where the variation of the detected value for the weld line position is not smaller than the predetermined value δ will be picked. The parameters are adjusted on the basis of these data, whereupon they are set so that there will be no possibility of unsuccessful weld line position detection, as well as lest the variation of the weld line position data exceed the set value ε. After setting the parameters in this manner, a robot position will be set so that the condition of the welding operation can best be observed, and the sectional data are picked in the predetermined robot position, with the conditional value for the sectional data detection being set to "1". If necessary, in this case, the sectional data may be picked with the conditional value set at "2" or "3".

According to the present invention, the sensor is activated so that the data detected by the sensor are picked and stored as hysteresis during the execution of the operation. Thus, the data can be analyzed and diagnosed, and the various parameters can be adjusted so that the sensor operates in an optimum state, thereby enabling the sensor to fully perform its function. By detecting and storing the two types of data, including, in particular, the data detected by the sensor and the data of operation target positions such as the weld line position to be obtained by analyzing the detected data, an analytic diagnosis of the sensor operation state can be made very easy, and the parameters can be efficiently set at optimum values.

We claim:

1. A diagnostic method for a real-time sensor mounted on a robot and used to detect a position of an operation target on a real-time basis, the operation target position being a location on an object that a particular operation is to be performed, said diagnostic method comprising the steps of:

(a) detecting a position of the object with the sensor during operation of the robot to obtain object position data indicative of the object position;

(b) analyzing the object position data obtained in said step (a) to determine operation target position data indicative of the operation target position;

(c) storing all of the operation target position data determined in said step (b), along with robot position data indicative of the robot positions at at least one time of the detection; and (d) diagnosing an operation state of the sensor by analyzing the data stored in said step (c) and, in response, adjusting parameters pertaining to the operation of the sensor.

2. A diagnostic method for a real time sensor mounted on a robot and used to detect a position of an object on a real-time basis and to detect an operation target position, which is a location on the object that a particular operation is to be performed, said diagnostic method comprising the steps of:

(a) detecting a position of the object with the sensor during operation of the robot to obtain object position data indicative of the object position;

(b) analyzing the object position data obtained in said step (a) to determine operation target position data indicative of the operation target position;

(c) storing the object position data obtained in said step (a) and the operation target position data determined in said step (b), along with robot position data indicative of designated robot positions at the time of the detection; and (d) diagnosing an operation state of the sensor by analyzing the object position data and operation target position data stored in said step (c) and, in response, adjusting parameters pertaining to the operation of the sensor.

3. A diagnostic method for a real-time sensor according to claim 2, wherein said object position data are stored only when the robot is positioned at the designated positions in said step (c).

4. A diagnostic method for a real-time sensor according to claim 2, wherein said step (b) comprises a step of determining whether the operation target position has failed to be detected and, in said step (c), the object position data are stored together with the robot position data at a point where the corresponding operation target position has failed to be detected.

5. A diagnostic method for a real-time sensor according to claim 2, wherein said step (b) comprises a step of determining the operation target position for each of two adjacent scan cycles of the sensor, and the object position data are stored in said step (c) when a difference between values of said operation target position for each of the two adjacent scan cycles is at least as great as a predetermined value.

6. A diagnostic method for a real-time sensor mounted on a robot and used to detect a position of an object on a real-time basis and to measure an operation target position, which is a location on the object that a particular operation is to be performed, said diagnostic method comprising the steps of:

(a) determining the operation target position by analyzing object position data indicative of the position of the object during the operation of the robot;

(b) selecting a conditional value representing a case corresponding to one of where the position of the robot is at a predetermined position, where the operation target position has failed to be detected, and where the variation of the operation target position from a previous operation target position of a previous cycle is at least as great as a set value;

(c) storing operation target position data indicative of the operation target position determined in said step (a), along with robot position data indicative of robot positions at a time of the measurement;

(d) storing the object position data in accordance with the conditional value selected in said step (b); and (e) diagnosing the operation state of the sensor by analyzing the operation target position data stored in said step (c) and the object position data stored in said step (d) and, in response, adjusting parameters pertaining to the operation of the sensor.

* * * * *